(12) United States Patent  (10) Patent No.: US 7,697,446 B2
Pedersen et al.  (45) Date of Patent: Apr. 13, 2010

(54) LINK TESTING IN AN ETHERNET DSL NETWORK

(75) Inventors: Steen Pedersen, Holstebro (DK); Mads Bligaard Nielsen, Struer (DK)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1848 days.

(21) Appl. No.: 10/762,623

(22) Filed: Jan. 22, 2004

(65) Prior Publication Data

US 2005/0025061 A1  Feb. 3, 2005

Related U.S. Application Data

(60) Provisional application No. 60/442,438, filed on Jan. 24, 2003.

(51) Int. Cl.
*G01R 31/08* (2006.01)
(52) U.S. Cl. .................... 370/249; 370/395.1; 370/465; 370/401; 370/241
(58) Field of Classification Search ........................ None
See application file for complete search history.

(56) References Cited

U.S. PATENT DOCUMENTS

| 5,043,976 | A  | * | 8/1991 | Abiven et al. | 398/136 |
| 6,731,627 | B1 | * | 5/2004 | Gupta et al. | 370/352 |
| 7,228,358 | B1 | * | 6/2007 | McManus | 709/239 |
| 7,349,345 | B1 | * | 3/2008 | Hansen et al. | 370/242 |
| 2004/0052263 | A1 | * | 3/2004 | Xu | 370/399 |
| 2006/0020449 | A1 | * | 1/2006 | Wong et al. | 704/215 |

* cited by examiner

*Primary Examiner*—Duc C Ho

(57) ABSTRACT

A system and method in a communications network of testing a communications link between Customer Premises Equipment (CPE) and a Broadband Remote Access Server (BBRAS). The CPE and BBRAS communicate mutually via an intermediate Internet Protocol Digital Subscriber Line Access Multiplexer (IPDSLAM). The CPE is connected to the IPDSLAM via an Asynchronous Transfer Mode (ATM) link, and the BBRAS is connected to the IPDSLAM via an Ethernet link. When a customer complaint is received in a Customer Care Center (CCC), the IPDSLAM is instructed to test the link. The IPDSLAM executes a first loop-back test with the CPE according to the ATM standard, and executes a second loop-back test with the BBRAS according to the Ethernet standard. The results of the first and second loop-back tests are reported to the CCC.

20 Claims, 3 Drawing Sheets

LINK TESTING IN AN ETHERNET DSL NETWORK

TECHNICAL FIELD

The present invention relates to digital communication systems. More particularly, and not by way of limitation, the present invention is directed to a system and method for testing the link between an end-user and a broadband network in an Ethernet-based Digital Subscriber Line (DSL) network.

BACKGROUND ART

Traditionally, Digital Subscriber Line (DSL) networks have been based on Asynchronous Transfer Mode (ATM) technology. ATM is a high-speed cell-based data transmission protocol. A Digital Subscriber Line Access Multiplexer (DSLAM) is a device that takes a number of DSL subscriber lines and concentrates them onto a single ATM line. Today's DSLAM network infrastructure is based on ATM technology between Customer Premises Equipment (CPE) on one side of the DSLAM and a Broadband Remote Access Server (BBRAS) on the other side of the DSLAM.

An ATM layer loop-back capability allows for operations-related information to be inserted at one location along a Virtual Path Connection (VPC) and to be returned or looped-back at a different location. When a customer has a complaint, operators normally execute a loop-back command in the BBRAS for testing the ATM Virtual Circuit towards the CPE. The CPE answers back with a loop-back signal. This test verifies the physical link between the CPE and the BBRAS. The bases for this functionality are described in ITU-T I.610, which is incorporated by reference herein.

DSLAM products have recently been launched based on Ethernet DSL technology. Instead of communicating mutually via only one transmission media, network nodes may mutually communicate via more than one transmission media. This creates a problem, however, in testing the connection between the CPE and the BBRAS. Operators, of course, desire to have the same testing functionality as they have in their existing DSL network in which ATM is used all the way from the CPE to the BBRAS. By adding Ethernet into the broadband network, however, the standard testing method is limited to the part of the connection between the DSLAM and the CPE (i.e., where ATM is used). A full verification of the connection between the CPE and the broadband network, which is based partly on ATM technology and partly on switched Ethernet, cannot be executed in the operator's network according to standard practice.

SUMMARY OF THE INVENTION

The present invention provides a system and method that solves the problems discussed above. The present invention provides a system and method for testing a communication link between end nodes when multiple transmission media are used between the end nodes and an intermediate node. The invention tests the link between the end nodes according to the operator's standard practice.

Thus, in one aspect, the present invention is directed to a method in a communications network of testing a communications link between a first end node and a second end node. The end nodes communicate mutually via an intermediate node, and the first end node is connected to the intermediate node via a first transmission medium and the second end node is connected to the intermediate node via a second, different transmission medium. The method includes the steps of executing a first loop-back test between the intermediate node and the first end node according to a standard of the first transmission medium; and executing a second loop-back test between the intermediate node and the second end node according to a standard of the second transmission medium. The method may also include reporting the results of the first and second loop-back tests from the intermediate node to a network management node such as a Customer Care Center. In an exemplary embodiment of the invention, the intermediate node is an Internet Protocol Digital Subscriber Line Access Multiplexer (IPDSLAM), the first end node is a Customer Premises Equipment (CPE), and the first transmission medium is Asynchronous Transfer Mode (ATM). Likewise, the second end node is a Broadband Remote Access Server (BBRAS), and the second transmission medium is Ethernet.

In another aspect, the present invention is directed to a system in a communications network for testing a communications link between a first end node and a second end node. Again, the end nodes communicate mutually via an intermediate node, and the first end node is connected to the intermediate node via a first transmission medium and the second end node is connected to the intermediate node via a second, different transmission medium. The system includes means in the intermediate node for sending a first loop-back test message from the intermediate node to the first end node according to a standard of the first transmission medium; means in the first end node for sending a response to the intermediate node upon successfully receiving the first loop-back test message; means in the intermediate node for sending a second loop-back test message from the intermediate node to the second end node according to a standard of the second transmission medium; and means in the second end node for sending a response to the intermediate node upon successfully receiving the second loop-back test message.

In yet another aspect, the present invention is directed to an intermediate node that connects a first end node and a second end node in a communications network. The intermediate node includes first communication means for communicating with the first end node via a first transmission medium. The first communication means includes means for sending a first loop-back test message from the intermediate node to the first end node according to a standard of the first transmission medium, and means for receiving a response to the first loop-back test message from the first end node. The intermediate node also includes second communication means for communicating with the second end node via a second transmission medium different from the first transmission medium. The second communication means includes means for sending a second loop-back test message from the intermediate node to the second end node according to a standard of the second transmission medium, and means for receiving a response to the second loop-back test message from the second end node.

An advantage of the present invention is that a link between end nodes can be verified according to an operator's normal practice even though different transmission media standards are used for the communication between the nodes. In addition, customer complaints can be handled on a per-service basis, with each customer request coming from a different service provider. Yet another advantage is that the operator's Customer Care Center (CCC) is provided with a complete customer overview when the present invention is combined with other standard functions within the DSL standard.

Another advantage is that configuration of some higher-level protocols such as Point-to-Point Protocol over Ethernet (PPPoE) can also be tested. This is done by the intermediate node, which acts on behalf of the CPE.

DETAILED DESCRIPTION OF EMBODIMENTS

In the following description, for purposes of explanation and not limitation, specific details are set forth, such as particular embodiments, circuits, signal formats, and the like in order to provide a thorough understanding of the present invention. It will be apparent to one skilled in the art that the present invention may be practiced in other embodiments that depart from these specific details.

Figure 1:
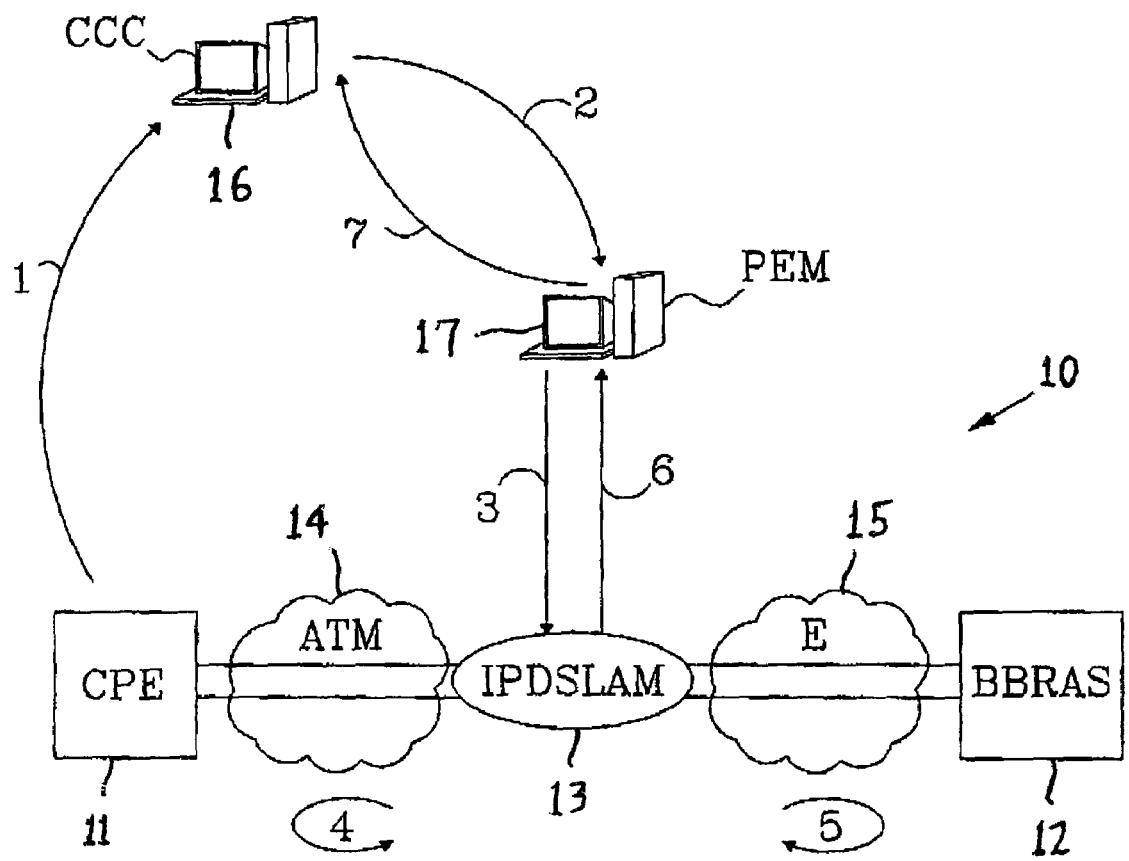
FIG. 1 is a simplified block diagram of a communication network in which two end nodes communicate with an intermediate node via more than one transmission media.

FIG. 1 is a simplified block diagram of a communication network 10 in which two end nodes communicate with an intermediate node via more than one transmission media. The network includes Customer Premises Equipment (CPE) 11 for receiving and transmitting voice and/or data signals. The network also includes a Broadband Remote Access Server (BBRAS) 12. The two end nodes CPE and BBRAS communicate via a intermediate Digital Subscriber Line Access Multiplexer (DSLAM) 13. When the DSLAM functions as a bridge between ATM and Ethernet-based networks, the DSLAM is called an Internet Protocol Digital Subscriber Line Access Multiplexer (IPDSLAM).

In this embodiment, the transmission media between the CPE 11 and the IPDSLAM 13 is provided by an ATM connection 14, and the transmission media between the IPDSLAM and the BBRAS 12 is provided by an Ethernet connection 15. The IPDSLAM serves as a router between one or more CPEs and one or more BBRASs. The CPE is connected to a network management node such as a Customer Care Center (CCC) 16. In this example, the CCC is connected to a Public Ethernet Manager (PEM) 17 that is connected to the IPDSLAM. However, the CCC can alternatively be interfaced directly to the IPDSLAM. The PEM initiates loop tests according to the invention after, for example, a customer complaint. This will be further explained below.

Figure 2:
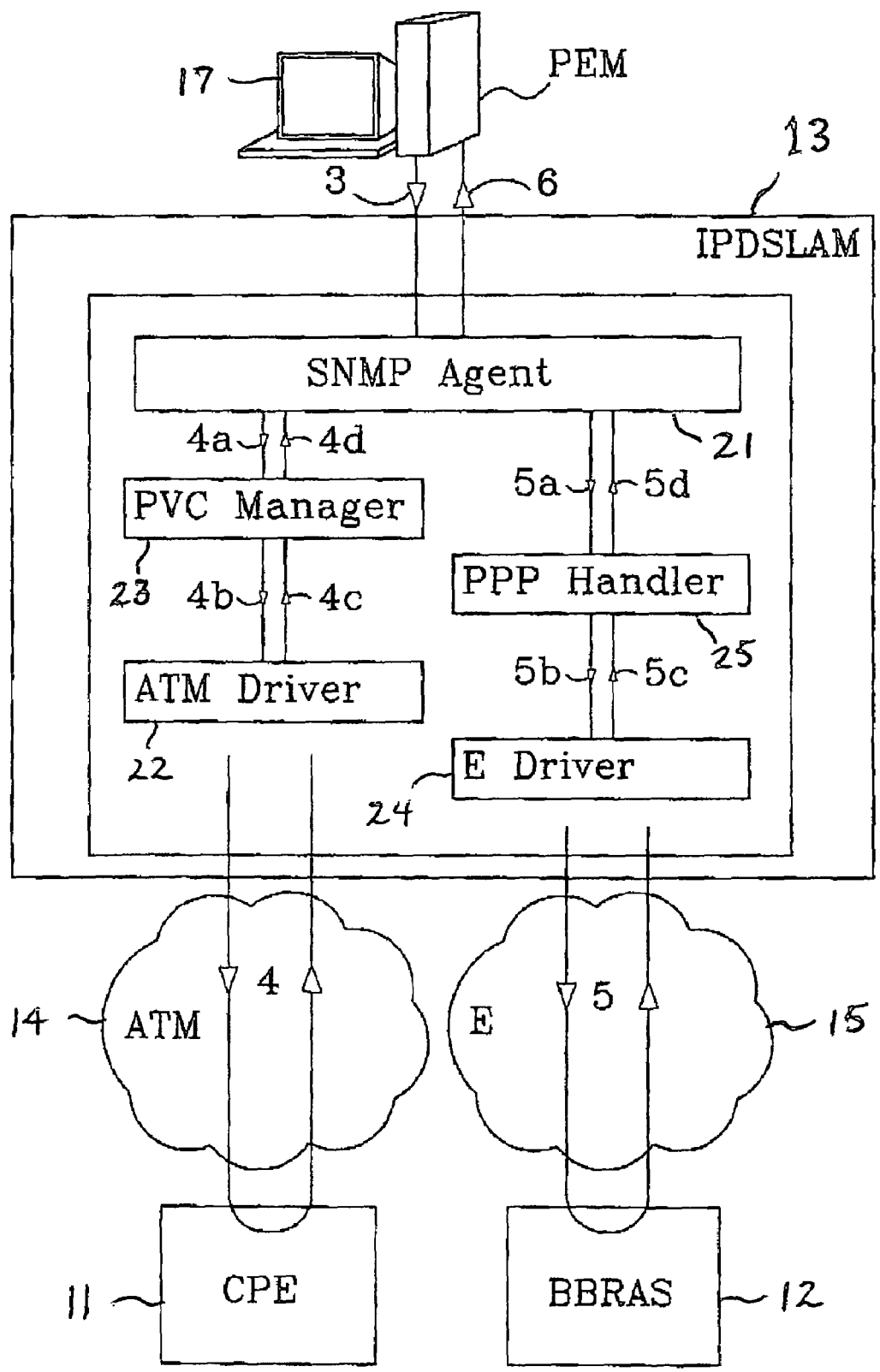
FIG. 2 is a simplified functional block diagram of the intermediate node illustrating its connections to the end nodes via different transmission media.

FIG. 2 is a simplified functional block diagram of the IPDSLAM 13 illustrating its connections to the CPE 11 and the BBRAS 12 via ATM 14 and Ethernet 15, respectively. FIG. 2 discloses software implementations and information flows in the IPDSLAM, which are involved during a test session according to the invention. FIG. 2 shows a test arrangement located within the IPDSLAM. The IPDSLAM is connected to the PEM 17, the CPE 11, and the BBRAS 12. A Simple Network Management Protocol (SNMP) Agent 21 provides an interface to the PEM. The SNMP Agent communicates with an ATM Driver 22 via a Permanent Virtual Circuit (PVC) Manager 23. The ATM Driver is an interface to the ATM transmission media 14. The PVC manager has knowledge of permanent virtual circuits in the ATM transmission media. B-ISDN operation and maintenance principles and functions can be found in ITU-T Recommendation I.610.

The SNMP Agent 21 is also attached to an Ethernet Driver 24 via a Point-to-Point (PPP) Handler 25. The Ethernet Driver is an interface to the Ethernet transmission media 15. The PPP Handler is able to locate servers in the Ethernet transmission media. A method for transmitting PPP over Ethernet can be found in Network Working Group RFC 2516, which is incorporated herein by reference.

Figure 3:
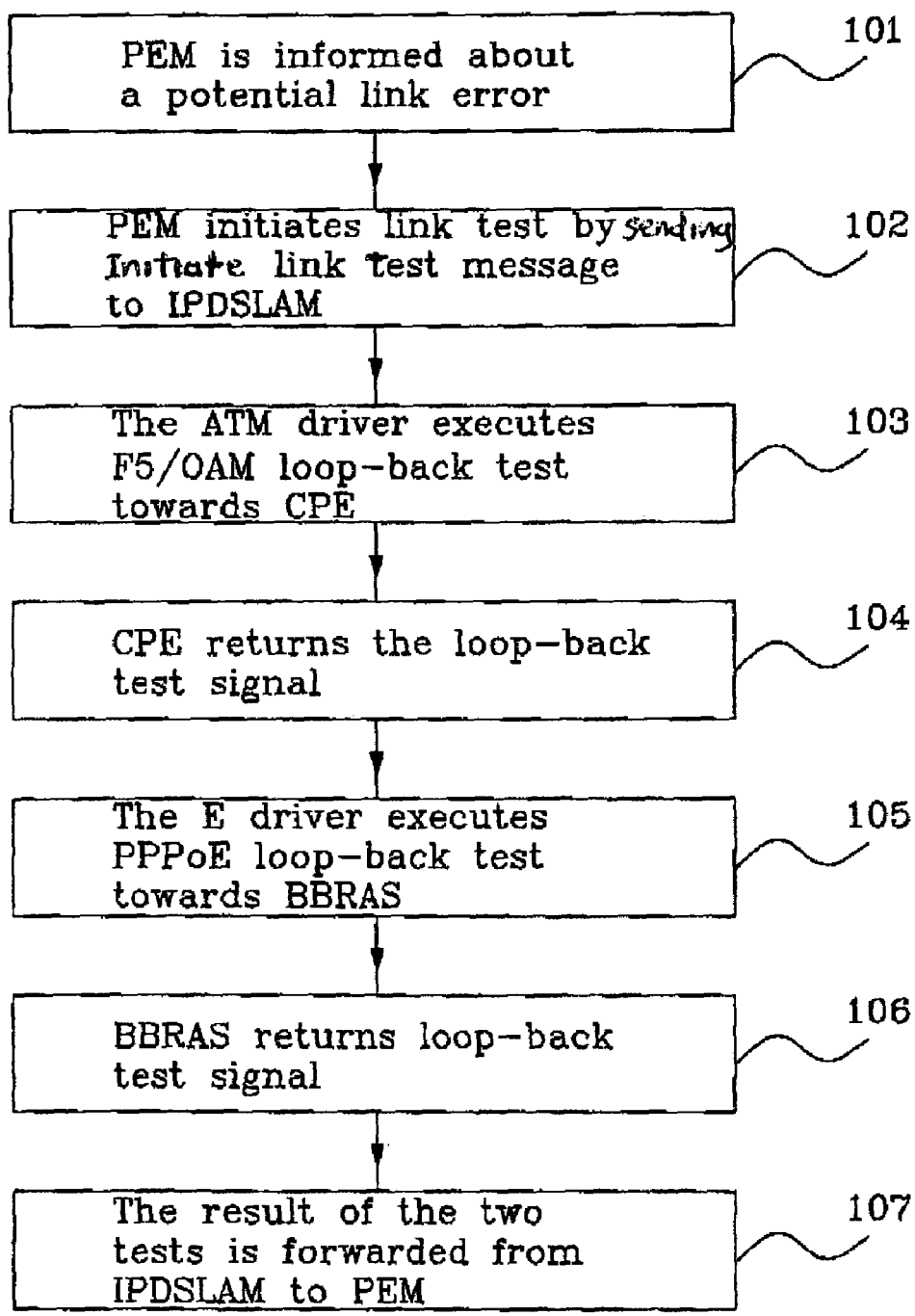
FIG. 3 is a flow chart illustrating some of the most significant steps in a test method according to the invention.

FIG. 3 is a flow chart illustrating some of the most significant steps in a test method according to a first embodiment of the invention. With reference to FIGS. 1-3, a link test method after a customer complaint will now be described. The link being tested is situated between the CPE 11 and the BBRAS 12, which communicate with the IPDSLAM 13 via ATM 14 and Ethernet 15, respectively. Thus, the link comprises two link parts, one part between the IPDSLAM and the CPE, and one part between the IPDSLAM and the BBRAS.

When the Customer detects a potential link error between the CPE 11 and the BBRAS 12, the customer sends a complaint message 1 to the CCC 16. The CCC examines the complaint message and finds a local server (i.e., the PEM 17) that is associated with the link being tested. At step 101, the CCC sends a Request Link Test message 2 from the CCC to the PEM. At step 102, the PEM initiates a link test by sending an Initiate Link Test message 3 from the PEM to the SNMP Agent 21 in the IPDSLAM 13.

The test is then divided into two parts. In a first part, the ATM transmission media 14 is tested, and in a second part, the Ethernet transmission media 15 is tested. It is to be noted that the internal signaling within the IPDSLAM 13, which will now be explained, is exemplary and can be modified within the scope of the claims. The internal IPDSLAM signaling is disclosed in FIG. 2.

First, the SNMP Agent 21 requests from the PEM 17, an ATM Circuit Check message 4a, which is sent to the PVC Manager 23. As noted above, the PVC Manager has knowledge of permanent virtual circuits in the ATM transmission media 14. The PVC Manager forwards information about the virtual circuit under test in a Circuit Check message 4b sent to the ATM Driver 22. Thereafter, at step 103, the ATM driver transmits an F5/OAM Loop-Back Test signal 4 to the CPE 11. At step 104, the CPE returns the Loop-Back Test signal to the ATM Driver. The Loop-Back Test signal detects errors such as incorrect configuration of the ATM PVC (identified by VPI/VCI) in the CPE equipment (when manually configured). The result of the loop-back test signal 4 is sent in an ATM Link Result message 4c to the PVC Manager 23, which forwards the message at 4d to the SNMP Agent 21.

The SNMP Agent 21 now continues by testing the Ethernet part, if the Access Method allows a test on this part of the network, like in this PPP over Ethernet (PPPoE) case. The SNMP Agent sends an Ethernet Check message 5a to the PPP Handler 25. The PPP Handler monitors bridged PPPoE traffic in the IPDSLAM and intercepts replies to discovery messages that were sent by this test function. The PPP Handler sends a Discovery message 5b to the Ethernet Driver 24. This may be performed by broadcasting a PPPoE Active Discovery Initiation (PADI) packet on the Switched Ethernet, to which each BBRAS responds with its name and the services it provides. At step 105, the Ethernet Driver executes a PPPoE Loop-Back Test signal 5 to the BBRAS 12. At step 106, the BBRAS returns the test signal 5 to the Ethernet Driver. The Loop-Back Test signal 5 detects errors such as incorrect configuration of the switched Ethernet network (including any Virtual LAN configuration), malfunction in the network, and incorrect configuration or malfunction of PPP servers in the BBRAS. The result of the Ethernet Loop-Back Test signal 5 is sent from the Ethernet Driver 24 to the PPP Handler 25 in an Ethernet Link Result message 5c. The PPP Handler forwards the Ethernet Link Result message at 5d to the SNMP Agent 21.

At step 107, the SNMP Agent 21 reports the results of the two tests to the PEM 17 in a Results message 6. The PEM forwards the Results message at 7 to the CCC 16. If the ATM test fails, it should be verified that the ATM PVC in the CPE is configured correctly. Otherwise, more detailed investigation is needed. If the PPPoE test fails, the problem may be either in the switched Ethernet network or in the BBRAS. In both cases, more detailed investigation is needed (not involving the CPE equipment).

Through these actions, it can be determined whether service personal must go in the field and correct broken cables or change the configuration of systems in the network. Sometimes changes of configuration of network elements leads to other failures and broken services.

It is to be observed that the message flow described in the above example, just is an example. Different variations are possible within the scope of the invention. For example can the PVC Manager report back to the PEM, the number of virtual circuits, before the actual ATM test starts, which test is initiated by the PEM. Other Ethernet based protocols like discovery of DHCP servers could replace the PPP discovery. In another example the SNMP Agent reports test results to PEM after each test, first the ATM test result and then the Ethernet test result.

The invention is, of course, not limited to the embodiment described above and illustrated by example in the drawings, but can be modified within the scope of the enclosed claims. Different variations are possible within the scope of the invention. The intermediate node between the two end nodes has been referred to as being a router, but the intermediate node can instead have other functionalities. The transmission media's referred to in the example above are ATM and Ethernet, but other types of media can also be tested in a similar manner. The second loop-back test has been shown to be executed by initiating PPPoE testing, but may alternatively be performed with other types of testing such as DHCP testing. Additionally, by utilizing Ethernet as the transport media between the DSLAM and the BBRAS, it is possible to utilize other types of BBRAS such as DHCP servers, which offer other types of validation methods for access to the service/broadband network. The transport media may be the same, but the access method used may differ from the one described. Finally, the end nodes in the example are CPE and a BBRAS. However, the end nodes can be of another type.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method in a communications network of testing a communications link between a first end node and a second end node, said end nodes communicating mutually via an intermediate node, wherein the first end node is connected to the intermediate node via a first transmission medium and the second end node is connected to the intermediate node via a second, different transmission medium, said method comprising the steps of:
    executing a first loop-back test between the intermediate node and the first end node according to a standard of the first transmission medium; and
    executing a second loop-back test between the intermediate node and the second end node according to a standard of the second transmission medium;
    wherein the intermediate node is an Internet Protocol Digital Subscriber Line Access Multiplexer (IPDSLAM) and the first transmission medium is Asynchronous Transfer Mode (ATM), and the step of executing a first loop-back test includes initiating the first loop-back test in the IPDSLAM by sending an ATM test signal on a virtual channel from the IPDSLAM to the first end node.

2. The method of testing a communications link of claim 1, wherein the first end node is a Customer Premises Equipment (CPE), and the step of initiating the first loop-back test in the IPDSLAM by sending an ATM test signal includes sending an F5 operations and maintenance loop-back test signal from the IPDSLAM to the CPE.

3. The method of testing a communications link of claim 2, wherein the step of executing a first loop-back test also includes receiving the F5 operations and maintenance loop-back test signal in the IPDSLAM when looped back by the CPE.

4. The method of testing a communications link of claim 1, further comprising reporting the results of the first and second loop-back tests from the intermediate node to a network management node.

5. The method of testing a communications link of claim 1, further comprising the steps of:
    prior to executing the first and second loopback tests, receiving in a Customer Care Center (CCC), a customer complaint regarding the communications link between the first and second end nodes;
    instructing the intermediate node to execute the first and second loopback tests in response to the customer complaint; and
    after executing the first and second loopback tests, reporting the results of the first and second loop-back tests from the intermediate node to the CCC.

6. A method in a communications network of testing a communications link between a first end node and a second end node, said end nodes communicating mutually via an intermediate node, wherein the first end node is connected to the intermediate node via a first transmission medium and the second end node is connected to the intermediate node via a second, different transmission medium, said method comprising the steps of:
    executing a first loop-back test between the intermediate node and the first end node according to a standard of the first transmission medium; and
    executing a second loop-back test between the intermediate node and the second end node according to a standard of the second transmission medium;
    wherein the intermediate node is an Internet Protocol Digital Subscriber Line Access Multiplexer (IPDSLAM) and the second transmission medium is Ethernet, and the step of executing a second loop-back test includes initiating the second loop-back test in the IPDSLAM by sending a Point-to-Point Protocol over Ethernet (PPPoE) test signal from the IPDSLAM to the second end node.

7. The method of testing a communications link of claim 6, wherein the second end node is a Broadband Remote Access Server (BBRAS), and the step of initiating the second loop-back test in the IPDSLAM includes broadcasting a PPPoE Active Discovery Initiation (PADI) packet from the IPDSLAM toward an Ethernet network in which the BBRAS is located.

8. The method of testing a communications link of claim 7, wherein the step of executing a second loop-back test also includes receiving in the IPDSLAM, a PPPoE Active Discovery Offer (PADO) response packet sent by the BBRAS, said PADO including the name of the BBRAS and services that the BBRAS provides.

9. The method of testing a communications link of claim 6, further comprising reporting the results of the first and second loop-back tests from the intermediate node to a network management node.

10. The method of testing a communications link of claim 6, further comprising the steps of:
prior to executing the first and second loopback tests, receiving in a Customer Care Center (CCC), a customer complaint regarding the communications link between the first and second end nodes;
instructing the intermediate node to execute the first and second loopback tests in response to the customer complaint; and
after executing the first and second loopback tests, reporting the results of the first and second loop-back tests from the intermediate node to the CCC.

11. The method of claim 10, wherein the customer complaint is received on a per-service basis from one of a plurality of service providers.

12. A method in a communications network of testing a communications link between a Customer Premises Equipment (CPE) and a Broadband Remote Access Server (BBRAS), said CPE and BBRAS communicating mutually via an intermediate Internet Protocol Digital Subscriber Line Access Multiplexer (IPDSLAM), wherein the CPE is connected to the IPDSLAM via an Asynchronous Transfer Mode (ATM) link, and the BBRAS is connected to the IPDSLAM via an Ethernet link, said method comprising the steps of:
executing a first loop-back test between the IPDSLAM and the CPE, said first loop-back test including:
sending an F5 operations and maintenance loop-back test signal from the IPDSLAM to the CPE;
receiving the F5 operations and maintenance loop-back test signal by the CPE; and
sending the F5 operations and maintenance loop-back test signal from the CPE to the IPDSLAM; and
executing a second loop-back test between the IPDSLAM and the BBRAS, said second loop-back test including:
sending a PPPoE Active Discovery Initiation (PADI) packet from the IPDSLAM to the BBRAS;
receiving the PADI packet by the BBRAS; and
sending a response from the BBRAS to the IPDSLAM with the name of the BBRAS and services that the BBRAS provides.

13. The method of testing a communications link of claim 12, further comprising reporting the results of the first and second loop-back tests from the intermediate node to a network management node.

14. A system in a communications network for testing a communications link between a first end node and a second end node, said end nodes communicating mutually via an intermediate node, wherein the first end node is connected to the intermediate node via a first transmission medium and the second end node is connected to the intermediate node via a second, different transmission medium, said system comprising:
means in the intermediate node for sending a first loop-back test message from the intermediate node to the first end node according to a standard of the first transmission medium;
means in the first end node for sending a response to the intermediate node upon successfully receiving the first loop-back test message;
means in the intermediate node for sending a second loop-back test message from the intermediate node to the second end node according to a standard of the second transmission medium; and
means in the second end node for sending a response to the intermediate node upon successfully receiving the second loop-back test message;
wherein the first end node is a Customer Premises Equipment (CPE), the second end node is a Broadband Remote Access Server (BBRAS), and the intermediate node is an Internet Protocol Digital Subscriber Line Access Multiplexer (IPDSLAM).

15. The system of claim 14, wherein the first transmission medium is Asynchronous Transfer Mode (ATM), and the second transmission medium is Ethernet.

16. The system of claim 14, further comprising a network management node in communication with the intermediate node, said network management node instructing the intermediate node to test the communication link between the first and second end nodes, and said intermediate node reporting to the network management node, the results of the first and second loop-back test messages.

17. The system of claim 16, wherein the network management node is a Customer Care Center.

18. An intermediate node that connects a first end node and a second end node in a communications network, said intermediate node comprising:
first communication means for communicating with the first end node via a first transmission medium, said first communication means including:
means for sending a first loop-back test message from the intermediate node to the first end node according to a standard of the first transmission medium; and
means for receiving a response to the first loop-back test message from the first end node;
second communication means for communicating with the second end node via a second transmission medium different from the first transmission medium, said second communication means including:
means for sending a second loop-back test message from the intermediate node to the second end node according to a standard of the second transmission medium; and
means for receiving a response to the second loop-back test message from the second end node;
wherein the intermediate node is an Internet Protocol Digital Subscriber Line Access Multiplexer (IPDSLAM), the first transmission medium is Asynchronous Transfer Mode (ATM), and the second transmission medium is Ethernet.

19. The intermediate node of claim 18, wherein the first communication means communicates using ATM with a first end node comprising a Customer Premises Equipment (CPE), and the second communication means communicates using Ethernet with a second end node comprising a Broadband Remote Access Server (BBRAS).

20. The intermediate node of claim 18, further comprising third communication means for communicating with a network management node, said third communication means including:
means for receiving instructions from the network management node to test the communication link between the first and second end nodes; and
means for reporting to the network management node, the results of the first and second loop-back test messages.

* * * * *